United States Patent [19]

Kurematsu et al.

[11] Patent Number: 5,057,191
[45] Date of Patent: Oct. 15, 1991

[54] PROCESSING METHOD OR PHOTOGRAPHIC PROCESSING WASTE LIQUOR

[75] Inventors: Masayuki Kurematsu; Shigeharu Koboshi; Nobutaka Goto; Naoki Takabayashi, all of Hino, Japan

[73] Assignee: Konica Corporation, Tokyo, Japan

[21] Appl. No.: 497,763

[22] Filed: Mar. 20, 1990

Related U.S. Application Data

[63] Continuation of Ser. No. 262,519, Oct. 25, 1988, abandoned.

[30] Foreign Application Priority Data

Nov. 1, 1987 [JP] Japan ................. 62-276416

[51] Int. Cl.$^5$ .................. B01D 3/34; B01D 3/42
[52] U.S. Cl. .................... 203/3; 73/23.2; 159/47.3; 203/DIG. 7; 203/DIG. 18; 422/5; 422/705; 436/55; 436/121
[58] Field of Search .................. 203/3, 6, 28, DIG. 7, 203/DIG. 18; 159/44, 47.3; 202/206; 436/119, 102, 120, 121, 55; 422/83, 98, 105, 109, 120, 5; 73/23.2; 354/300

[56] References Cited

U.S. PATENT DOCUMENTS

| | | | |
|---|---|---|---|
| 3,300,282 | 1/1967 | Risk et al. | 436/121 |
| 3,312,529 | 4/1967 | Evano | 436/121 |
| 3,733,994 | 5/1973 | Armstrong et al. | 202/152 |
| 3,998,714 | 12/1976 | Armstrong | 210/752 |
| 4,174,202 | 11/1979 | Simpson | 436/121 |
| 4,279,773 | 7/1981 | Traney et al. | 436/121 |
| 4,332,774 | 6/1982 | Drum et al. | 422/109 |
| 4,334,955 | 6/1982 | Zoeke et al. | 159/44 |
| 4,387,165 | 6/1983 | Youngblood | 422/98 |
| 4,399,684 | 8/1983 | Advani et al. | 73/23 |
| 4,432,224 | 2/1984 | Typpo | 73/23 |
| 4,797,180 | 1/1989 | Schnider et al. | 204/432 |

FOREIGN PATENT DOCUMENTS

56-33996 8/1981 Japan.

OTHER PUBLICATIONS

Patent Abstracts of Japan, vol. 11, No. 335 (P-632) [2782], 4th Nov. 1987, p. 68 P 632; & JP-A-62 118 348 (Konishiroku Photo Ind. Co., Ltd), 29-05-1987.
ISA Transactions, vol. 12, No. 1, 1973, pp. 70-77; R. Villalobos et al.: "On-line analysis of SO2 in flue gas and other process streams by gas chromatography", *p. 70, right-hand column, lines 8-24*.

*Primary Examiner*—Virginia Manoharan
*Attorney, Agent, or Firm*—Frishauf, Holtz, Goodman & Woodward

[57] ABSTRACT

A disposal device for photographic processing waste liquor which concentrates the photographic process waste liquor by evaporation. The disposal device has a gas detecting device for detecting gas which may be generated during the evaporation of the waste liquor and a control device for stopping the evaporation based on the detection of a concentration of a specific gas. The processing method for photographic waste liquor involves evaporating the waste liquor to concentrate it and detecting gases which are generated during the evaporation process. When the concentration of a specific gas reaches a certain level, the evaporation step is halted.

12 Claims, 2 Drawing Sheets

PROCESSING METHOD OR PHOTOGRAPHIC PROCESSING WASTE LIQUOR

This application is a continuation of application Ser. No. 07/262,519, filed Oct. 25, 1988, now abandoned.

BACKGROUND OF THE INVENTION

This invention relates to a disposal device for evaporation disposal of waste liquor generated as by developing processing of a photographic light-sensitive material, by The invention refers to a device for use with automatic developing machine for photography (hereinafter abbreviated to as "photographic processing waste liquor" or "waste liquor"), particularly to a disposal device for photographic processing waste liquor suitable for disposal as arranged with an automatic developing machine or in the vicinity of an automatic developing machine.

Generally speaking, photographic processing of a light-sensitive silver halide photographic material has been performed by combining the steps by use of processing liquors having one or more of the functions such as developing, fixing, water washing, etc. in the case of black-and-white light-sensitive materials, and color developing, bleach-fixing (or bleaching and fixing), water washing, stabilizing, etc. in the case of color light-sensitive material.

In photographic processing in which a large amount of light-sensitive materials are processed, the components consumed by processing are supplemented, while the components thickened dissolution or evaporation in the processing liquor by processing (e.g. bromide ion in a developing solution, or silver complexes in a fixing solution) are removed to maintain the components in the processing liquor at constant levels. According to such means, supplementing solutions are supplemented into the processing liquors, and a part of the processing liquors are discharged for removal of the thickened components in the photographic processing.

In recent years, there is a trend in which the amount supplemented of solutions including washing water which is supplementing liquid for water washing is reduced to great extent for the reasons in pollution or economy, but photographic processing waste liquor is led through a waste liquor pipe from the processing tank of the automatic developing machine, and diluted with waste water of washing water or cooling water of the automatic developing machine before being discarded into sewage, etc.

However, due to strengthened pollution regulation in recent years, although discarding of washing water or cooling water into sewage or rivers may be possible, discarding of photographic processing liquors other than these [e.g. developing solution, fixing solution, color developing solution, bleach-fixing solution (or bleaching solution and fixing solution), stabilizing solution, etc.] is substantially practically impossible. For these reasons, the respective photographic processing dealers are using to professional waste liquor disposal dealers for recovery of waste liquor with recovery fee or have pollution disposal equipments installed. However, using waste liquor dealers requires considerable space for storage of waste liquor, and it is very expensive in cost. Further, the pollution disposal equipment is extremely large in initial cost, and also considerable vast place is required for installation to disadvantage.

Accordingly, waste liquor is generally recovered by waste liquor recovery dealers to be detoxified by secondary and tertiary disposal. However, the waste liquor receipt price is not only becoming higher year by year due to increased recovery fee, but also due to poor recovery efficiency in mini-laboratories, etc., recovery order can be responded to with difficulty, whereby there ensues such problem that waste liquors are filled in the store, etc.

For solving these problems, for the purpose of effecting disposal of photographic processing waste liquor easily in mini-laboratories, etc., studies have been made to evaporate water and then dry or solidify suspended component of the photographic processing waste liquor by heating, as disclosed in Japanese Provisional Utility Model Publication No. 70841/1985.

Whereas, in the case of evaporation concentration of photographic processing waste liquor, the properties of the precipitates will change with progress of evaporation concentration whereby the precipitates will lose fluidity to be discharged from the processing section with difficulty. Accordingly, one may consider to set the processing time for evaporation concentration by metering photographic processing waste liquor, etc., but the working to meter the amount and set the processing time depending on the respective processing volume is cumbersome.

Accordingly, means for detecting the change in properties of the precipitates by evaporation concentration easily have been variously studied, and consequently it has been found that specific sulfur type compounds frequently used in fixing solution or bleach-fixing solution contained in photographic processing waste liquor by evaporation concentration, for example, thiosulfates or sulfites are decomposed to change the properties of the precipitates, whereby fluidity is lost, and also sulfurous acid gas, hydrogen sulfide gas are generated. Accordingly, by detecting the gas concentration generated by evaporation concentration, thereby stopping evaporation concentration, there can be obtained precipitates which can be easily taken out.

SUMMARY OF THE INVENTION

The present invention has been accomplished in view of the problems of the prior art as described above, and is intended to provide a disposal device for photographic processing waste liquor which stops the disposal from the gas concentration generated by evaporation concentration of photographic processing waste liquor to obtain precipitates which can be easily taken out.

The present invention, in order to solve the above problems, provides a disposal device for photographic processing waste liquor by heating photographic processing waste liquor to effect evaporation concentration, comprising a gas detecting means for the gas concentration generated in disposal of said photographic processing waste liquor and a control means for stopping concentration disposal on the basis of the gas concentration from the gas detecting means equipped therein.

Also, the present invention provides a processing method of photographic processing waste liquor having evaporation concentration processing, which comprises the steps of detecting gases generated in the evaporation concentration processing of the photographic processing waste liquor; and then stopping said evaporation concentration processing on the basis of a concentration of a specific gas among the detected gases.

DESCRIPTION OF THE PREFERRED EMBODIMENTS

Figure 1:
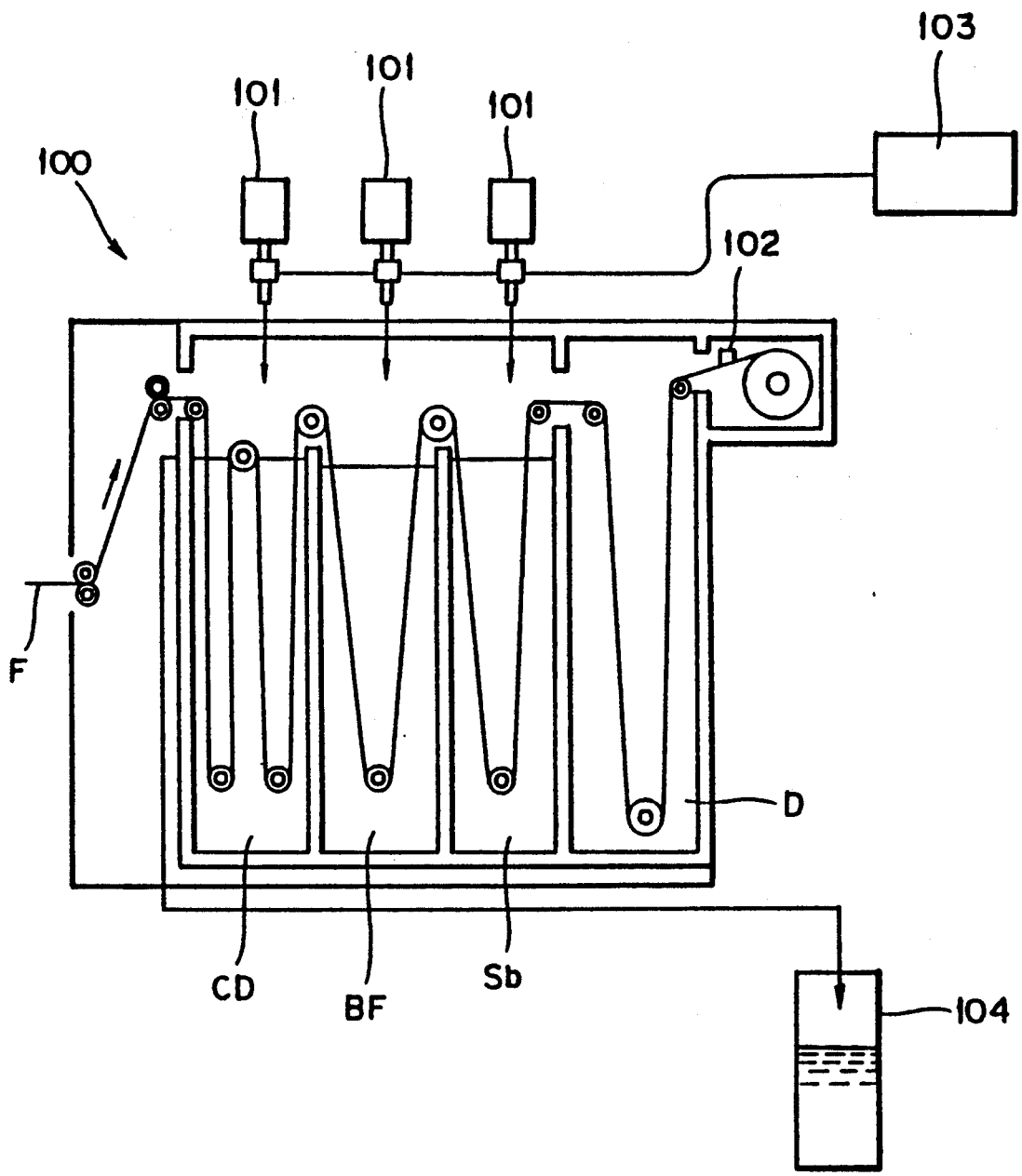
FIG. 1 is a schematic illustration of an automatic developing machine.

When photographic processing waste liquor is heated by a heating means to be evaporated and concentrated, the concentration of the specific gas is detected by a gas detecting means and disposal of evaporation concentration is stopped at a predetermined level of gas concentration by a control means. Accordingly, the changes in the properties of the precipitates with progress of evaporation concentration of photographic processing waste liquor can be prevented and this control is performed by detection, and therefore control of stopping evaporation concentration of the gas concentration can be simply done.

The gas detecting means may be those which can detect gases generated as well as detect the concentration of a separated specific gas or those which can detect only the concentration of a specific gas, but preferably be a sensor for detecting hydrogen sulfide gas and/or sulfurous acid gas.

As the sensor detecting such gases, there are, for example, semiconductor sensor, constant potential electrolytic system sensor, disphragm Gaval system, etc. In this invention, for example, there may be employed the sensors as described in "Practical Handbook of Chemical Sensor", published by Kabushiki Kaisha Fuji Technosystem; "Technical Development of New Sensor and Optimum Selection and Use", published by Keiei Kaihatsu Center, Publishing Division; and "Collection of Sensor Application Technologies", published by Kabushiki Kaisha Keiei System Kenkyusho, etc.

Also, in the present invention, for stopping evaporation concentration, it is preferred to deodorize the odor by spraying a deodorant. The position where the gas concentration is detected is not limited to the inside of the evaporation batch where evaporation concentration is effected, but it can be also located at the place where cooling, condensing means or liquid reservoir tank is located, further inside or outside of the main device in which these disposal sections are housed.

The detected gas concentration for stopping evaporation concentration disposal, for one kind of gas, should be preferably set in the range from 0.1 to 1000 ppm, more preferably from 1 to 100 ppm, particularly preferably from 2 to 20 ppm.

Further, as the deodorizer, deodorant for deodorizing the odor, there may be employed the deodorizers, deodorants as described in "Development and Application of New Deodorizers", published by Kabushiki Kaisha Toray Research Center, and deodorizers, deodorants, in the specifications of the Patents as described on pp. 143 to 161 thereof.

When a gas is detected, deodorizing can be effected by adding a compound in the concentrate in the evaporating means. Examples of such compound may include hydroxides of metals such as $KOH$, $NaOH$, $Ca(OH)_2$, $NH_4OH$, $Mg(OH)_2$, $LiOH$ and other hydroxides of Al, Ba, Be, Ce, Co, Cu, Fe, Zn, etc. As salts of the above metals, there may be included carbonates, bicarbonates, phosphates, borates, sulfites, further other alkaline buffer agents, organic acid salts, alkali metal salts of chelating agents, etc. Preferably, $KOH$, $NaOH$, $Ca(OH)_2$, $NH_4OH$, $Fe(OH)_3$, carbonates, sulfites, preferably the compounds as mentioned above may be formed into an aqueous solution, which is delivered into the evaporation means by actuating a pump based on the gas detecting signal. The amount may be preferably in the range from 0.1 to 500 g, particularly from 1 to 50 g per one liter of the concentrate. Further, it may be also preferred to use $K_2CO_3$ and $K_2SO_3$ in combination.

Further, as the control when hydrogen sulfide gas is detected, if the gas concentration exceeds the set value, the heating means is stopped, the deodorant is liberated and supplementing of photographic processing waste liquor is stopped. After a certain period of time, cooling fan, air circulation pump, etc. are also stopped. In this case, when the deodorant is liberated into the evaporation means, in order to maintain the deodorizing effect, the heating means is stopped after elapse of a certain period of time, for example, 10 minutes, followed by stopping of driving of other devices similarly, etc. However, these operations are not limitative of the present invention.

The heating means in contact with photographic processing waste liquor in the present invention may be a nichrome wire, or a heater molded by working such as cartridge heater, quartz heater, Teflon (trade name) heater, rod heater or panel heater, or heating by microwave may be possible. Also, an electroconductive material may be directly contacted with photographic processing waste liquor, and current may be passed through the electroconductive material into photographic processing waste liquor, thereby effecting heating.

The electroconductive material may be constituted by selecting at least one composition from among single crystalline Si, polycrystalline Si, $Ta_2N$, $Ta\text{-}SiO_2$, $ZrO_2$, ZrN, TiN, Cr-Si-O, SiC, SiC-Zr, SiC-Cr, SiC-Hf, SiC-Ti, SiC-Mo, SiC-W, SiC-Nb, SiC-Ta, SiC-La, B, B-Mo, B-La, B-Cr, B-Tr, B-Na, B-Ta, W, B-W, B-V, C, C-halogen, C-Si, C-Ge, C-H, Pt, Mo, Mo-Si, $MoSi_2$, CaO, MgO, $Y_2O_3$, $La_2(CrO_4)$, and can suppress generation of odor generated during evaporation concentration by catalytic action, influence from current, etc. Also, the above composition may be preferably used merely as the resistance material to be formed into a heater insulated against photographic processing waste liquor, and further ceramic heater, etc. may be available.

The heating means is arranged so that the whole may be dipped into photographic processing waste liquor, or alternatively arranged so that a part may be dipped therein, and evaporation of such photographic processing waste liquor may be preferably effected by heating by means of a heating means for accomplishing improvement of waste liquor disposal efficiency (disposal speed), and the heating temperature may be preferably about 120° to 130° C.

The evaporation means may assume any desired form, including cubic body, cylindrical column, polygonal column, typically square column, cone, polygonal pyramid, typically tetragonal pyramid, or a combination of some of them, but it is preferably shaped longitudinally lengthy so that the temperature difference of photographic processing waste liquor between the vicinity of the heating means and the bottom may be greater. Further, in order to reduce blow-out accident by abrupt boiling as far as possible, the space above the waste liquor surface in the evaporation means should be preferably made as broad as possible.

The material for the evaporation means may be any material if it is heat-resistant, such as heat-resistant glass, titanium, stainless steel, carbon steel, heat-resistant plastic, etc., but from the standpoint of safety and corrosion resistance, stainless steel (preferably SUS 304 or SUS 316, particularly preferably SUS 316) or titanium may be preferred.

The evaporation means is equipped with a heating means for heating photographic processing waste liquor preferably to about 120° to 130° C., and this may be also located in the waste liquor but it is also possible to heat the waste liquor in the evaporation means through the wall of the evaporation means by providing it externally of the evaporation means. The heating means may be located at any position where waste liquor in the evaporation means can be heated, but it is preferred to locate the heating means so as to heat the upper portion of the photographic processing waste liquor in the evaporation means, thereby creating difference in temperature between the photographic processing waste liquor in the vicinity of the heating means and the bottom of the photographic processing waste liquor, as described in Japanese Provisional Patent Publication No. 141692/1988, and it is preferred for enhancing the effect of the present invention to locate the heating means so that the temperature difference may become 5° C. or higher.

This invention has a condensing means which cools and condenses the vapor evaporated, and for condensing means can be adopted all kinds of heat exchange means, which may be any constitution of (1) the shell and tube type (polytubular type, muffled tube type), (2) the double tubular type, (3) the coil type, (4) the spiral type, (5) the plate type, (6) the fin tube type, (7) the trombone type and (8) the air-cooling type.

Also, the heat exchange type reboiler technique can be used and (1) the vertical thermosiphon type, (2) the horizontal thermosiphon type, (3) the overflow tubular type (kettle type), (4) the compulsory circulation type, (5) the internal insertion type, etc. may be employed.

Further, the heat exchange technique of the condenser system may be employed, namely either one of (1) the direct condenser system, (2) the tower built-in system, (3) the tower top location system, (4) the separation system, etc.

It is also possible to use a cooler, and any desired system of cooler may be available. The air-cooled system heat exchanger can be also advantageously used, which may be either of (1) the forced aeration system and (2) the blown aeration system.

According to a preferred embodiment, the condensing means is constituted of a heat dissipating device having a heat dissipating plate (fan for air cooling) located at the vapor discharging pipe for discharging evaporated vapor, and has a means for feeding water on the heat dissipating plate. In this case, water may be preferably fed in shower from above the heat dissipating device onto the heat dissipating plate. Water may be also fed onto the heat dissipating plate through a valve or an electromagnet valve, if necessary, from, for example, a plug of tap water. In this case, the means for feeding water refers to a plug of tap water, a water feeding pipe, etc., but preferably stored water may be fed onto the heat dissipating plate through various quantitative or non-quantitative metering pumps as described above. Particularly preferably, it is constituted that stored water may be circulated in such a manner that water in the water tank provided below the heat dissipating plate device is fed in shower through a pump onto the heat dissipating plate and again stored in the water tank below. In this case, a liquid level sensor is preferably provided in the stored water tank and a signal emitted when the liquid level becomes lower than a certain level, whereby exhaustion of stored water can be known and water can be fed again.

The condensing means is constituted of a heat dissipating plate device having a heat dissipating plate (fan for air cooling) located at the vapor discharging pipe for discharging evaporated vapor, and when it possesses a means for feeding water on the heat dissipating plate, it preferably have a motor fan for air cooling at the same time. Particularly, in this case, the motor fan for air cooling should be provided so that the air may be passed through the heat dissipating plate device to be discharged out of the evaporation concentration disposal device of the present invention, because condensation at the electrically armored portion within the evaporation concentration disposal device of the present invention can be prevented.

The condensate obtained by cooling and condensing the evaporated vapor is stored in a tank for storing condensate (stored liquid tank), and the stored liquid tank is preferably located internally of the evaporation concentration device of the present invention for making the space smaller, and in this case, the stored liquid tank is preferably located on a stand capable of being withdrawn for making workability better.

Further, the constitutions of the evaporation means, heating means and condensing means of the present invention are described in detail in Japanese Patent Applications No. 69435/1987, No. 69436/1987 and No. 69437/1987 previously filed by the present applicant.

Next, as to typical examples of photographic processing waste liquor for which disposal according to the present invention can be applied, those as described in Japanese Patent Application No. 194615/1987 can be used. Particularly, in the evaporation concentration disposal device of the present invention, photographic processing waste liquor containing large amounts of thiosulfates, sulfites, ammonium salts and organic acid ferric complex salts can be effectively disposed, and extremely effective when containing organic acid ferric complexes and thiosulfates.

BRIEF DESCRIPTION OF THE DRAWINGS

FIG. 1 is a diagrammatic representation of an automatic developing machine.

Figure 2:
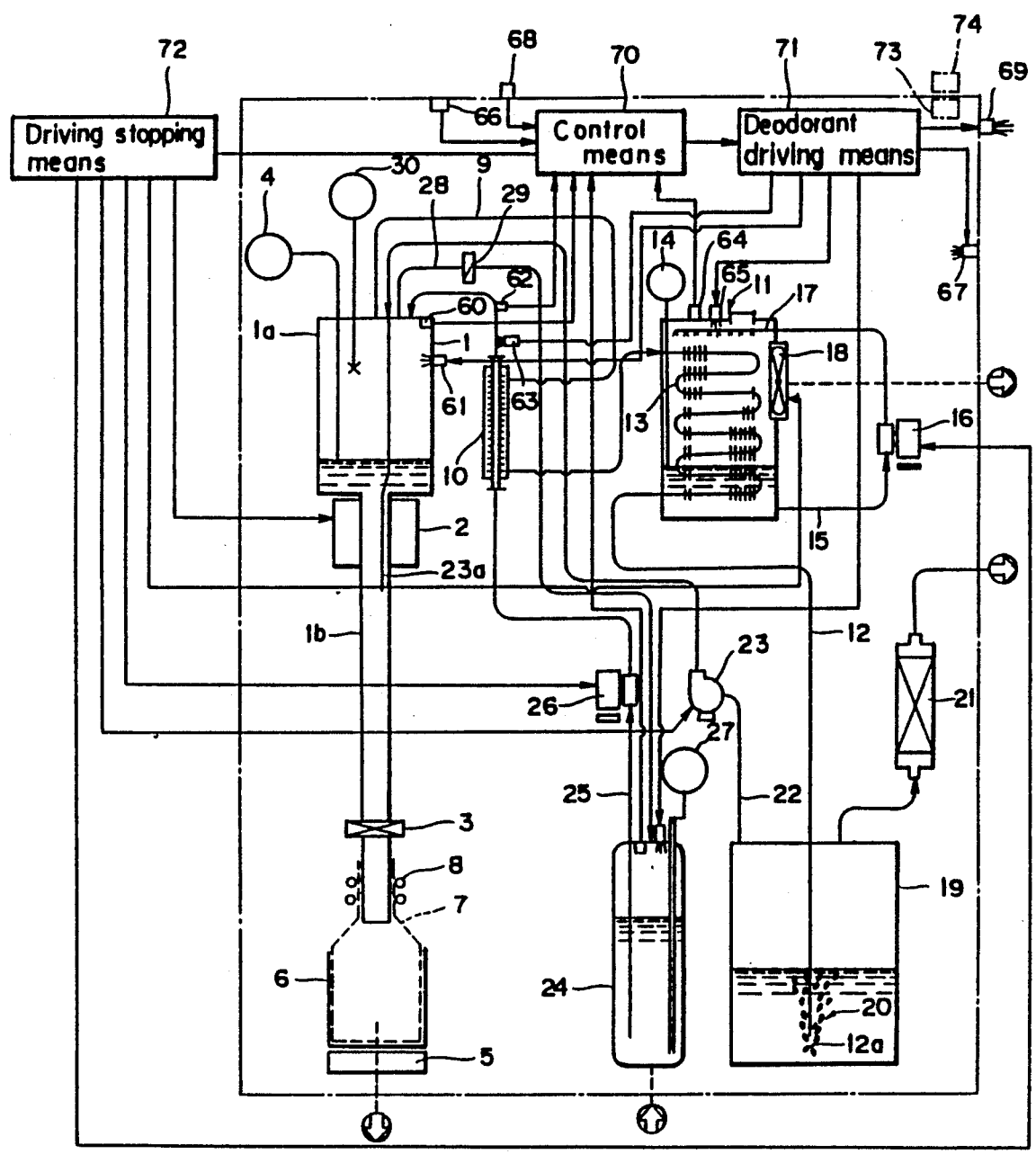
FIG. 2 is a schematic constitutional diagram showing an embodiment of the present invention.

FIG. 2 is a diagrammatic representation of a disposal device for photographic processing liquor of the present invention.

As a preferred application example of the present invention, the present device is suitable for performing disposal of photographic processing waste liquor generated with developing processing of a light-sensitive photographic material by an automatic developing machine within the automatic developing machine or in the vicinity thereof. Here, the automatic developing machine and photographic processing waste liquor are explained.

Automatic developing machine

In FIG. 1, the automatic developing machine is shown by the reference numeral 100, and one shown in the figure is of the system in which a roll-shaped light-sensitive photographic material F is guided continuously through a color developing tank CD, a bleach-fixing tank BF and a stabilizing processing tank Sb to perform photographic processing and after drying D, wound up. The reference numeral 101 is a supplementing solution tank, and the photographic processing amount of the light-sensitive photographic material F is detected by a sensor 102, and following the detected information, the supplementing solution is supplemented to each processing tank by the control device 103.

When the supplementing solution is supplemented to each photographic processing tank, overflowed waste liquor is discharged from the processing tank and collected in the stock tank 104. As the means for transferring the overflowed photographic processing waste liquor to the stock tank 104, a simple method is to permit the waste liquor to fall naturally through a guide pipe. It can be sometimes also compulsorily transferred by means of a pump, etc.

Also, as described above, although there is difference in components in the photographic processing tanks, CD, BF, Sb, in the present invention, it is preferred to mix all the photographic processing liquors and dispose the mixture comprehensively.

EXAMPLES

FIG. 2 illustrates schematically a constitution of the disposal device for photographic processing liquor of the present invention.

In the figure, the reference numeral 1 is an evaporation kettle as the evaporation means, which is constituted of a cylindrical columnar upper part 1a with larger diameter and a cylindrical columnar lower part 1b with smaller diameter, the lower part 1b being provided with a heating means 2, and further below with a ball valve 3. The evaporation kettle 1 is provided with a liquid level sensor 4, and further on a supporting stand 5 arranged at the lower part 1b of the evaporation kettle 1 is mounted a sludge receiver 6, and the sludge receiver 6 is provided below the lower part 1b, and a bag 7 made of polypropylene is fixed by an O-ring 8 internally thereof. At the upper part 1a of the evaporation kettle 1 is provided with a vapor discharging pipe 9, and the vapor discharging pipe 9 is connected through a heat exchanger 10 and a condensing means 11 to a stored liquid introducing pipe 12.

In the condensing means 11, a number of heat dissipating plates 13 for cooling are provided at the vapor discharging pipe 9, and further a liquid level sensor 14 is provided. At the lower part of the condensing means 11 is provided a cooling water introducing pipe 15, which is connected through a cooling water circulating pump 16 to a shower pipe 17 perforated with a number of small holes.

The air within the condensing means 11 is discharged by a motor fan 18 for air cooling out of the disposal device. The stored liquid introducing pipe 12 is connected into the stored liquid tank 19, and the tip end 12a of the stored liquid introducing pipe 12 is positioned below the stored liquid surface in the stored liquid tank 19 to constitute a bubbling mechanism 20. Further, at the upper part of the stored liquid tank 19 is provided an activated charcoal cartridge 21 for housing activated charcoal. The stored liquid tank 19 is provided with an air introducing pipe 22, and its tip end 22a is introduced through an air pump 23 into the waste liquor in the evaporation kettle 1. Reference numeral 24 is a waste liquor feeding tank, which is provided with a waste liquor introducing pipe 25 and connected through a Bellows pump 26 and a heat exchanger 10 to the upper part 1a of the evaporation kettle. The waste liquor feeding tank 24 is further provided with a liquid level meter 27.

The upper part 1a of the evaporation kettle 1 is further provided with a guide pipe 28, which is connected through a plunger disc 29 to the waste liquor feeding tank 24, and the upper part 1a of the evaporation kettle 1 is also provided with a temperature sensor 30.

The upper part 1a of the evaporation kettle 1 is equipped with a gas sensor 60 and a deodorant sprayer 61; the supplementing portion of photographic processing waste liquor with a gas sensor 62 and a deodorant sprayer 63; the condensing means 11 with a gas sensor 64 and a deodorant sprayer 65; the main device internally with a gas sensor 66, a deodorant 67; and further the main device externally with a gas sensor 68, a deodorant sprayer 69. The detection signals from these gas sensors 60, 62, 64, 66 and 68 are inputted into the control means 70, and when the gas concentrations are higher than the values set respectively at the gas sensors at the control means 70, it derives the deodorant driving means 71 to actuate the deodorant sprayers 61, 63, 65, 67 and 69, and further drives the running stopping means 72 to stop actuation of the predetermined disposal device.

Next, the outline of the process of heating, evaporation disposal by use of this device is to be explained.

About 20 liters of the overflowed liquid from the automatic developing machine are stored in the waste liquor feeding tank 24, and to the stored liquid tank 19 are connected the activated charcoal cartridge 21 filled with activated charcoal, the stored liquid introducing pipe 12 and the air introducing pipe 22. Within the sludge receiver 6 below the lower part 1b of the evaporation kettle 1, the bag 7 made of polypropylene was placed and fixed with two O-rings 8 to the lower part 1b of the evaporation kettle 1. After water is fed into the condensing means 11, the switch is turned on, whereby the air pump 23 is actuated and the air within the stored liquid tank 19 is introduced through the air introducing pipe 22 into the evaporation kettle 1 and the air is released from the tip end 22a located further below the heating means 2.

Then, the motor fan 18 for air cooling and the cooling water circulation pump 16 are actuated in this order, the stored water passing through the cooling water introducing pipe 15 is fed to the shower pipe 17 or onto the heat dissipating plate 13 of the vapor discharging pipe 9 housed within the condensing means 11 and again stored at the lower part of the condensing means 11. Circulation occurs in such a manner.

Through actuation of Bellows pump 26, the waste liquor within the waste liquor feeding tank 24 passes through the waste liquor introducing pipe 25, then through the heat exchange means 10 and is delivered into the evaporation kettle 1. When the waste liquor amount in the evaporation kettle 1 is increased and the liquid level is detected by the liquid level sensor 4 for, for example, 3 seconds or longer actuation of the Bellows pump 28 stops, simultaneously with the switch being turned on at the heating means 2 to initiate heating evaporation.

Evaporation concentration is effected by heating evaporation, and the air is introduced through the feeding pipe 70 and by such stirring, the vapor bubbles are released at early stage and the bubbles are fine. Accordingly, heating decomposition can be alleviated to lower the odor gas existing in the vapor generated by evaporation concentration to great extent, whereby generation of hydrogen sulfide, sulfur type odor can be alleviated even when concentration may be proceed. Owing to this effect, when the liquid amount of the waste liquor in the evaporation kettle 1 is reduced to lower the liquid level, and the liquid level becomes to be not detected by the liquid level sensor 4 for 3 seconds or longer, the switch of the Bellows pump 26 is again turned on to repeat the actuation that the waste liquor in the waste liquor feeding tank 24 is fed into the evaporation tank 1. The vapor evaporated from the evaporation tank 1 passes through the vapor discharging pipe 9, and the vapor is subjected to heat exchange with waste liquor in the heat exchanger 10, and then passes through the condensing means 11, whereby a part of the vapor is condensed to become condensate. The condensate passes together with the residual gas in the vapor through the stored liquid introducing pipe 12, is delivered into the stored liquid tank 19, released through the tip end 12a below the stored liquid surface, and the condensate is stored within the stored liquid tank 19. At this time, bubbling is effected by ascending of the gas released from below the stored liquid surface through the stored liquid, and by the effect of bubbling, the gas such as hydrogen sulfide, etc. dissolved in the stored liquid is expelled out of the liquid, and the gas is returned by actuation of the air pump 23 through the air introducing pipe 22 from the stored liquid tank 19 to the photographic processing waste liquor positioned at the lower part within the evaporation kettle 1.

The stored liquid tank 19 is communicated to the air through the activated charcoal cartridge 21 filled with activated charcoal, whereby release of odor into the air is prevented.

When exhaustion of the waste liquor within the waste liquor feeding tank 24 is detected by the liquid level sensor 27, actuating of the Bellows pump 26 stops, the switch of the heating means 2 is turned off, the cooling water circulation pump 16, the motor fan 18 for air cooling will stop two hours later, simultaneously with lighting of a lamp and buzzing of a buzzer to inform completion of the evaporation concentration disposal, and also the air pump 23 stops. Here, by opening the ball valve 3, the sludge in the evaporation kettle 1 is permitted to fall into the bag 7 made of polypropylene, and then the bag taken out by detaching O-ring 8.

In the process of evaporation concentration, when exhaustion of the stored water in the condensing means 11 is detected by the liquid level sensor 14, the lamp is lighted, simultaneously with buzzing of a buzzer to inform exhaustion of the stored water.

In the process of evaporation concentration, when the liquid level in the evaporation kettle 1 is lowered for some reason and the temperature sensor 30 detects elevation of the temperature in the evaporation kettle 1 to 120° C. by heating in absence of liquid, the lamp is lighted simultaneously with buzzing of an alarm buzzer, and also the switch of the heating means 2 is turned off, and thereafter the evaporation concentration disposal is intermitted according to a series of actuations as described above.

Further, as shown by the broken line in FIG. 2, deodorants 73 and 74 can be also provided internally or externally of the main device, and the location places are not limited, but they can be arranged at any desired place.

EXPERIMENTAL EXAMPLE 1

By use of an automatic developing machine RP-800 for MPS processing system paper (produced by Konica Corporation), a commercially available paper for color photography (produced by Konica Corporation) was subjected to picture printing, followed by continuous processing by use of the following processing steps and processing liquors.

Standard processing steps:

| | | | |
|---|---|---|---|
| (1) | Color developing | 40° C. | 3 min. |
| (2) | Bleach-fixing | 38° C. | 1 min. 30 sec. |
| (3) | Stabilizing | 25° C.–35° C. | 3 min. |
| (4) | Drying | 75° C.–100° C. | about 2 min. |

Processing liquor compositions:

(Color developing tank solution)

| | |
|---|---|
| Ethylene glycol | 15 ml |
| Potassium sulfite | 2.0 g |
| Potassium bromide | 1.3 g |
| Sodium chloride | 0.2 g |
| Potassium carbonate | 24.0 g |
| 3-Methyl-4-amino-N-ethyl-N-(B-methane-sulfonamidoethyl)aniline sulfate | 5.5 g |
| Fluorescent brightener (4,4'-diamino-stilbenedisulfonic acid derivative) | 1.0 g |
| Hydroxylamine sulfate | 3.0 g |
| 1-Hydroxyethylidene-1,1-diphosphonic acid | 0.4 g |
| Hydroxyethyliminodiacetic acid | 5.0 g |
| Magnesium chloride hexahydrate | 0.7 g |
| Disodium 1,2-dihydroxybenzene-3,5-disulfonate | 0.2 g |

Made up to one liter with addition of water and adjusted to pH 10.20 with potassium hydroxide and sulfuric acid.

(Color developing supplementing solution)

| | |
|---|---|
| Ethylene glycol | 20 ml |
| Potassium sulfite | 3.0 g |
| Potassium carbonate | 24.0 g |
| Hydroxylamine sulfate | 4.0 g |
| 3-Methyl-4-amino-N-ethyl-N-(B-methane-sulfonamidoethyl)aniline sulfate | 7.5 g |
| Fluorescent brightener (4,4'-diamino-stilbenedisulfonic acid derivative) | 2.5 g |
| 1-Hydroxyethylidene-1,1-diphosphonic acid | 0.5 g |
| Hydroxyethyliminodiacetic acid | 5.0 g |
| Magnesium chloride hexahydrate | 0.8 g |
| Disodium 1,2-dihydroxybenzene-3,5-disulfonate | 0.3 g |

Made up to one liter with addition of water and adjusted to pH 10.70 with potassium hydroxide and sulfuric acid.

(Bleach-fixing tank solution)

| | |
|---|---|
| Ferric ammonium ethylenediaminetetraacetate dihydrate | 60.0 g |
| Ethylenediaminetetraacetic acid | 3.0 g |
| Ammonium thiosulfate (70% solution) | 100.0 ml |
| Ammonium sulfite (40% solution) | 27.5 ml |

Made up to the total amount of one liter with addition of water and adjusted to pH 7.1 with potassium carbonate or glacial acetic acid.

(Bleach-fixing supplementing solution A)

| | |
|---|---|
| Ferric ammonium ethylenediaminetetraacetate dihydrate | 260.0 g |
| Potassium carbonate | 42.0 g |

Made up to the total amount of one liter with addition of water and adjusted to pH 6.7 ± 0.1 with acetic acid or aqueous ammonia.

(Bleach-fixing supplementing solution B)

| | |
|---|---|
| Ammonium thiosulfate (70% solution) | 250.0 ml |
| Ammonium sulfite (40% solution) | 25.0 ml |
| Ethylenediaminetetraacetic acid | 17.0 g |
| Glacial acetic acid | 85.0 ml |

Made up to the total amount of one liter with addition of water and adjusted to pH 5.3 ± 0.1 with acetic acid or aqueous ammonia.

(stabilizing solution and supplementing solution substituting for water washing)

| | |
|---|---|
| Ethylene glycol | 1.0 g |
| 2-Methyl-4-isothiazolin-3-one | 0.20 g |

| | |
|---|---|
| 1-Hydroxyethylidene-1,1-diphosphonic acid (60% aqueous solution) | 1.0 g |
| Ammonia water (25% aqueous ammonium hydroxide solution) | 2.0 g |
| Made up to one liter with water and adjusted to pH 7.0 with 50% sulfuric acid. | |

The automatic developing machine was filled with the above color developing tank solution, bleach-fixing tank solution and stabilizing tank solution, and the running test was conducted while treating the above commercially available color photographic paper sample and supplementing the above color developing supplementing solution, bleach-fixing supplementing solutions A and B, and the stabilizing supplementing solution through the Bellows pump. The amounts supplemented per 1 m² of the color paper were respectively 190 ml as the supplemented amount to the color developing tank, each 50 ml of the bleach-fixing supplementing solutions A and B to the bleach-fixing tank and 250 ml of the stabilizing supplementing solution substituting for water washing to the stabilizing tank. The stabilizing tanks in the automatic developing machine were made the first to the third tank in the direction of flow, and a multi-tank countercurrent system was employed in which supplementing was effected from the final tank, the overflowed solution from the final tank was permitted to flow into the tank in the preceding stage, and further the overflowed solution therefrom into the tank in the preceding stage.

Continuous processing was performed until the total amount of the stabilizing solution substituting for water washing supplemented became 3-fold of the stabilizing tank volume.

After color negative films GX-100 (produced by Konica Corporation) were exposed in the conventional manner, by use of an automatic developing machine obtained by modification of a negative film processor NPS-FP34 (produced by Konica Corporation), continuous processing was performed under the developing processing conditions shown below.

| Processing step | Time hr., min. | Temperature °C. | Tank volume liter | Amount supplemented ml/dm² |
|---|---|---|---|---|
| Color developing | 3'15" | 38 ± 0.3 | 18 | 15 |
| Bleach-fixing first tank | 2'00" | 38 ± 0.3 | 15 | — |
| Bleach-fixing second tank | 2'00" | 38 ± 0.3 | 15 | 10 |
| No washing stabilizing first tank | 1'00" | 38 ± 0.3 | 9 | — |
| No washing stabilizing second tank | 1'00" | 38 ± 0.3 | 9 | 10 |
| Stabilizing | 40" | 38 ± 0.3 | 9 | 10 |
| Drying | 1'30" | 38 ± 0.3 | | |

From the no water washing stabilizing (second tank) to the no water washing stabilizing (first tank), the countercurrent system (two-stage countercurrent) was used, and similarly for bleach-fixing, from the bleach-fixing (second tank) to the bleach-fixing (first tank), the countercurrent system was used.

The amount of the processing liquor carried over from the preceding tank of each tank was 0.6 ml/dm².

In the following, the recipes of the tank solutions and the respective supplementing solutions are shown.

| | |
|---|---|
| Color developing tank solution: | |
| Potassium carbonate | 30 g |
| Sodium sulfite | 2.0 g |
| Hydroxylamine sulfate | 2.0 g |
| 1-Hydroxyethylidene-1,1-diphosphonic acid (60% aqueous solution) | 1.0 g |
| Hydroxyethyliminodiacetic acid | 3.0 g |
| Magnesium chloride | 0.3 g |
| Potassium bromide | 1.2 g |
| Sodium hydroxide | 3.4 g |
| N-ethylene-N-β-hydroxyethyl-3-methyl-4-aminoaniline chloride | 4.6 g |
| Made up to one liter with addition of water and adjusted to pH 10.1 with sodium hydroxide. | |
| Color developing supplementing solution: | |
| Potassium carbonate | 40 g |
| Sodium sulfite | 3.0 g |
| Hydroxylamine sulfate | 3.0 g |
| Diethylenetriaminepentaacetic acid | 3.0 g |
| Potassium bromide | 0.9 g |
| Sodium hydroxide | 3.4 g |
| N-ethylene-n-β-hydroxyethyl-3-methyl-4-aminoaniline chloride | 5.6 g |
| Made up to one liter with addition of water and adjusted to pH 10.1 with sodium hydroxide. | |
| Bleach-fixing tank solution and supplementing solution: | |
| Ferric ammonium diethylenetriaminepentaacetate | 0.5 mole |
| Hydroxyethyliminodiacetic acid | 20 g |
| Ammonium thiosulfate (70% weight/volume) | 250 ml |
| Ammonium sulfite | 15 g |
| 2-Amino-5-mercapto-1,3,4-thiadiazole | 1.0 g |
| Aqueous ammonia (28%) | 20 ml |
| Made up to one liter with addition of water and adjusted to pH 7.6 with acetic acid and aqueous ammonia. | |
| No water washing stabilizing tank solution and supplementing solution: | |
| 5-Chloro-2-methyl-4-isothiazolin-3-one | 0.01 g |
| 2-Methyl-4-isothiazolin-3-one | 0.01 g |
| Ethylene glycol | 2.0 g |
| Ferric ammonium diethylenetriaminepentaacetate | 0.03 mole |
| Made up to one liter with addition of water and adjusted to pH 10.0 with aqueous ammonia and sulfuric acid. | |
| Stabilizing tank solution and supplementing solution: | |
| Formalin (37% aqueous solution) | 3 ml |
| Konidax (produced by Konica Corporation) | 7 ml |
| Made up to one liter with addition of water. | |

Stabilizing processing was performed until the amount supplemented of the color developing solution into the tank became 3-fold of the color developing solution tank volume.

The waste liquors of the above color negative film and the color paper were mixed at a ratio of 1:1 and used.

EXPERIMENT 1

In a disposal device, in which 10 ppm of hydrogen sulfide in the photographic processing waste liquor was set as the detection concentration in FIG. 2, the above waste liquors each individually and a mixture thereof were processed. As the result, fluidity of precipitates collected at the sludge receiver 6 in FIG. 2 is preferred and no clogging due to the precipitates at the part 1b in FIG. 2 is occurred.

A processing time from initiating processing of the photographic processing waste liquor to stopping the processing by the set gas detection concentration is shown in Table 1.

TABLE 1

| Kind of waste liquor | Processing time (hour) |
|---|---|
| Color paper | |
| Whole liquid mixing | 10 |
| CD | 25 |
| BF | 5 |
| No washing stabilizing | 25 |
| Color negative | |
| Whole liquid mixing | 10 |
| CD | 25 |
| BF | 3 |
| No washing stabilizing | 25 |
| Stabilizing | 100 |
| Paper and negative whole liquid mixing | 10 |

The processing times shown in the above Table 1 were just good times for processing the photographic processing waste liquor.

EXPERIMENT 2

In the experiment of the overall waste liquor of paper negative in Experiment 1, at the time of stopping of concentration processing, a solution of 200 g/liter of $K_2CO_3$ and 100 g/liter of $K_2SO_3$ was added. As the result, the odor of the concentrate taken out after stopping was very little as compared with the case of no addition, and also the odor ($H_2S$) in the stored liquid was lowered from 3 ppm to 0.5 ppm, thus giving preferred results.

EXPERIMENT 3

In the experiment of the paper negative overall waste liquor in Experiment 1, the experiments of liberating Epolion T (trade name, produced by Epolion Co.), Odridspray (trade name, produced by Biocheid Japan Co.), Kozoreclean (trade name, produced by King Kagaku Co.) and Freshraimatsh (trade name, produced by Shiraimatsu Shinyaku Co.) as the deodorant into the device. As the result, as compared with the case in absence of a deodorant, the odor was found to be lowered to greater extent, giving preferred results.

The disposal device for photographic processing waste liquor of the present invention as described above has been made such that the evaporation concentration disposal is stopped by the control means when the gas concentration is detected by a gas detecting means to become a predetermined value, and therefore fluidity of the precipitates formed by evaporation concentration will not be damaged, whereby the precipitates obtained by evaporation concentration can be easily taken out without attachment on the inner walls of the evaporation means.

Further, since control of stopping the evaporation concentration is performed by detecting the gas concentration, the control information for stopping the evaporation concentration can be obtained simply and surely.

We claim:

1. A method of processing photographic waste liquor which comprises the steps of:
    effecting evaporation concentration of the photographic waste liquor
    providing a condensing means to cool and condense vapor generated in the evaporation concentration of the photographic waste liquor;
    detecting a predetermined concentration of hydrogen sulfide and/or sulfurous gas generated in the evaporation concentration of the photographic waste liquor; and then
    stopping said evaporation concentration when said predetermined concentration of the gas is detected, wherein said predetermined concentration is 0.1 to 1000 ppm.

2. The method according to claim 1, wherein said photographic waste liquor contains at least one of thiosulfates, sulfites, ammonium salts and organic acid ferric complex salts.

3. The method according to claim 1, wherein said predetermined concentration of said gas is 1 to 100 ppm.

4. The method according to claim 3, wherein said predetermined concentration of said gas is 2 to 20 ppm.

5. The method according to claim 1, further comprising adding a deodorizer or a deodorant at the time of, or after stopping said evaporation concentration.

6. The method of claim 5, wherein said deodorizer or deodorant is selected from the group consisting of KOH, NaOH, $Ca(OH)_2$, $NH_4OH$, $Mg(OH)_2$, LiOH, hydroxides of Al, Ba, Be, Ce, Co, Cu, Fe and Zn, carbonates, bicarbonates, phosphates, borates and sulfites of Al, Ba, Be, Ce, Co, Cu, Fe, Zn, K, Na, Ca, $NH_4$, Mg or Li, alkaline buffer agents, organic acid salts and alkali metal salts of chelating agents.

7. The method according to claim 5, wherein said deodorizer or deodorant is selected from the group consisting of KOH, NaOH, $Ca(OH)_2$, $NH_4OH$, $Fe(OH)_3$, carbonates and sulfites of Al, Ba, Be, Ce, Co, Cu, Fe, Zn, K, Na, Ca, Mg or Li.

8. The method according to claim 5, wherein said deodorizer or deodorant is added in the form of an aqueous solution into the evaporation means.

9. The method according to claim 5, wherein said deodorizer or deodorant is a mixture of $K_2CO_3$ and $K_2SO_3$.

10. The method according to claim 5, wherein an amount of said deodorizer or deodorant is in the range from 0.1 to 500 g per one liter of the concentrate.

11. The method according to claim 10, wherein an amount of said deodorizer or deodorant is in the range from 1 to 50 g per one liter of the concentrate.

12. A method of processing photographic waste liquor comprising:
    effecting evaporation concentration of the photographic waste liquor, said evaporation concentration being accompanied by the generation of hydrogen sulfide and/or sulfurous gas, and of vapor;
    providing a condensing means to cool and condense the vapor; p1 detecting a predetermined concentration of the hydrogen sulfide and/or sulfurous gas generated in the evaporation concentration of the photographic waste liquor, said predetermined concentration being 0.1 to 1,000 ppm;
    stopping said evaporation concentration when said predetermined concentration of the gas is detected; and
    adding a deodorizer at the time of stopping or after stopping said evaporation concentration, in an amount of 0.1 to 500 grams per liter of the concentrate.

* * * * *